United States Patent [19]
Powell et al.

[11] Patent Number: 6,138,327
[45] Date of Patent: Oct. 31, 2000

[54] FLEXIBLE STRAP ARRANGEMENT

[76] Inventors: Andrew P. Powell, 29 Hall Ave., Somerville, Mass. 02144; Michael J. Lamontagne, 258A Rte. 5, Dayton, Me. 04005

[21] Appl. No.: 09/387,539

[22] Filed: Aug. 31, 1999

[51] Int. Cl.⁷ .................................................. A44B 21/00
[52] U.S. Cl. ........................... 24/16 PB; 24/306; 24/300; 24/298
[58] Field of Search ................. 24/16 PB, 16 R, 24/17 A, 17 AP, 301, 302, 298, 442; 292/318, 319, 320, 321, 322

[56] References Cited

U.S. PATENT DOCUMENTS

| | | |
|---|---|---|
| 2,861,311 | 11/1958 | Kurland ..................................... 24/300 |
| 3,403,427 | 10/1968 | Asseo et al. .......................... 24/300 X |
| 3,653,098 | 4/1972 | Lagarde et al. . |
| 4,339,488 | 7/1982 | Brockman . |
| 4,409,163 | 10/1983 | Van Manen . |
| 5,075,066 | 12/1991 | Terada et al. . |
| 5,135,694 | 8/1992 | Akahane et al. . |
| 5,419,475 | 5/1995 | Naritomi . |
| 5,459,907 | 10/1995 | Nivet ................................. 24/16 PB X |
| 5,647,614 | 7/1997 | Asakura . |
| 5,852,849 | 12/1998 | Lansing et al. ........................ 24/298 X |
| 5,970,585 | 10/1999 | Scholey ............................ 24/16 PB X |

*Primary Examiner*—Robert J. Sandy

[57] ABSTRACT

The present invention includes an elongated securement strap comprised of a plurality of joined segments. The strap preferably comprises of an elongated first webbed segment of material having a first end and a second end, an elongated second segment of material having a first end and a second end; and an elongated third webbed segment of material having a first end and a second end, wherein the segments are joined in an overlapping relationship to form the elongated strap. The second end of the first segment and the first end of the third segment have securement openings therein. The middle or second segment of the elongated strap is comprised of a stretchable material to permit ease of strapping and holding objects together.

8 Claims, 2 Drawing Sheets

FLEXIBLE STRAP ARRANGEMENT

BACKGROUND OF THE INVENTION

1. Field of the Invention

This invention relates to a strap design and strap arrangement for bundling items together, and more particularly to a multicomponent strap assembly and its method of manufacture.

2. Prior Art

Straps in one form or another have been utilized by mankind for many centuries, for holding things together and bundling them in a convenient manner. Certain straps are suited for particular uses. Inherent in all straps is the need for simplicity, security, and resilience. One particular fastening band of the prior art is shown in U.S. Pat. No. 5,647,614 to Asakura. This patent discloses a fastening band with a cap molded or mechanically attached thereon, to minimize sharp edges on that strap. U.S. Pat. No. 5,419,475 to Naritomi shows a shoulder belt with a plastic body that surrounds a portion of the entire strap. The plastic that encases the strap is used as a shoulder buffer. The U.S. Pat. No. 5,135,694 to Akahane et al. discloses a wristband for wristwatches wherein a conductive member is encased within a molded wristband. U.S. Pat. No. 4,409,163 to Van Manen shows a continuously extruded strap utilized for the automobile industry with a high tensile strength internal strip, which serves as a support element. The support element is enclosed within a molded cover having a firm outer side and a soft inner side. The strap is extruded onto a support element in a continuous operation.

It is an object of the present invention, to provide a simple strap that is resilient and easy to utilize.

It is a further object of the present invention to provide a resilient strap which has multiple components the combination of which, permits flexibility and yieldability in that strap.

It is still yet a further object of the present invention to provide a strap which is inexpensive and readily manufacturable, while being able to provide the security necessary for it's simple function.

BRIEF SUMMARY OF THE INVENTION

The present invention relates to a multiple component elongated strap having a first or receiving end and a second or tongue end thereon. The elongated strap is composed of three approximately equally long segments, which segments overlap and intermate to provide flexibility, stretchability, and gripability or engageability. The first or receiving end comprises an elongated web of nylon, having a receiving buckle at its distalmost portion. The receiving buckle comprises a peripherally walled housing having a central opening there-through. The first segment as a second end with a plurality of openings therethrough.

The elongated strap has a middle segment which is comprised of a molded band of silicone rubber or other such elastomer material. The portion of the proximal end of the first segment intermates with a first end of the middle segment. The molded band of silicone intrudes within the openings at the proximal end of the first segment to function as securement or anchoring means therebetween. The middle segment of the elongated strap comprising the silicone band also has a second end.

The third segment of the elongated strap, comprising the tongue of the strap is comprised of an elongated web of nylon. The third segment has a proximal end which intermates with the second end of the middle segment, the nylon segment also having a plurality of openings therethrough, into which the molded silicone flows and is disposed. The openings in the proximal end of the third segment of the nylon strap provide the lockability between the middle segment (of silicone) and the tongue portion of the elongated strap.

It is thus intended that the preferred embodiment of the present invention be comprised of multiple components of material such as silicone and nylon, which are inter-engaged. The webs of nylon segments comprise the ends of the elongated strap, and the silicone segment comprised the mid or central portion of the strap to permit stretchability thereof. The nylon segments are secured within the respective ends of the silicone segment and are locked therein by virtue of the opening through the webs of nylon, into which the silicon flows during the molding/manufacturing process and in some cases by chemically bonding between the two materials.

During the manufacturing process, the respective first and third segments, that is the nylon components of the elongated strap, would be mated within a pair of openings within a mold. The holes within those straps would be received within that mold, and silicone would be injected within the mold, to create the elongated middle segment of that strap, that silicone filling those openings within the respective ends of the strap.

A further preferred embodiment of the present invention comprises the replacement of the respective nylon segments, by an elongated flexible strip having a hook and loop construction, such as Velcro™ thereon. Each elongated first and third segment would have their respective openings therethrough for engagement by the silicone would thus provide the stretchability to this second preferred embodiment, and the respective outer ends of the strap would have securement means thereon for securing the two respective ends theretogether.

Thus what has been shown is a novel multi-component securable strap arrangement which permits flexibility and stretchability in a securement strap. The amount of stretchability is, of course, dependent upon the length of the elongated middle segment of silicone. It is contemplated that in each of the preferred embodiments, the first, second and third segments are of approximately the same length.

The present invention thus comprises an elongated securement strap comprised of a plurality of joined segments, comprising an elongated first webbed segment of material having a first end and a second end, an elongated second segment of material having a first end and a second end and an elongated third webbed segment of material having a first end and a second end, wherein the segments are joined in an overlapping relationship to form the elongated strap. The second end of the first segment and the first segment and the first end of the third segment have securement openings therein. The second segment comprises a middle portion of the elongated strap. The second segment is comprised of a stretchable material. The stretchable material is comprised of silicone. The stretchable material fills-in the securement openings in the first and second segments of the elongated strap during a manufacturing process thereof. The first and third segments are preferably comprised of nylon. The first and third segments may also be comprised of a securement material. Such a securement material may consist of a hook and loop fabric. The elongated securement strap may have a receiving buckle thereon.

The invention also includes a method of manufacture of a multi-component, elongated securement strap, comprising the steps of forming a plurality of a securement openings into one end of a first segment and a third segment of a webbed material, placing the securement openings of the elongated first segment and third segments of webbed material in a longitudinally-aligned, spaced-apart relationship in a mold, introducing a stretchable material into the mold to engage and fill-in the openings; and allowing the stretchable material to cool, to permit the elongated strap to be removed from the mold. The stretchable material may be comprised of silicone. The first and third segments may be comprised of nylon. The first and third segments may also be comprised of a securement material. Such securement material may consist of a Velcro™ fabric.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENTS

Figure 1:
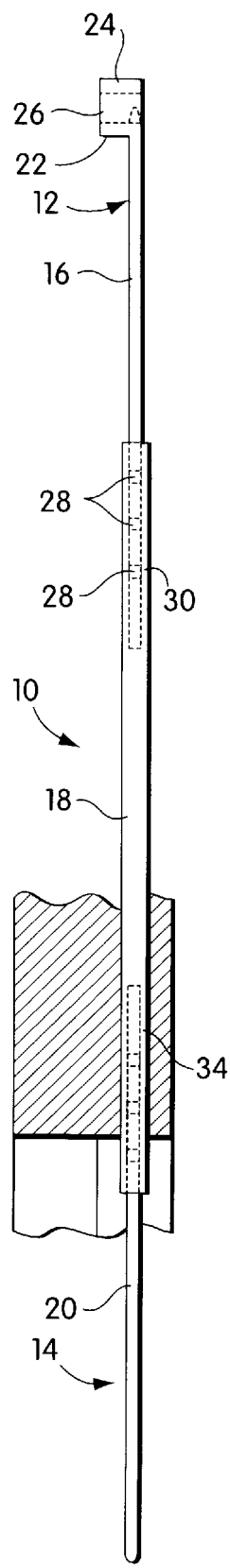
FIG. 1 is a plan view of a multi-component strap constructed according to the principles of the present invention.

Referring now to the drawings in detail, and particularly to FIG. 1, there is shown the present invention that comprises a multiple component elongated strap 10 having a first or receiving end 12, and a second or tongue end 14 thereon. The elongated strap 10 is composed of three (3) approximately equally long segments 16, 18 and 20, which segments 16, 18 and 20 overlap and intermate to provide flexibility, stretchability, and gripability or engageability. The first or receiving end 12 comprises an elongated web of nylon having a receiving buckle 22 at its distalmost portion. The receiving buckle 22 may comprise a peripherally walled housing 24 having a central opening therethrough. The first segment 16 has a second end 26 with a plurality of openings 28 therethrough, as may also be seen in a side view in FIG. 2.

Figure 2:
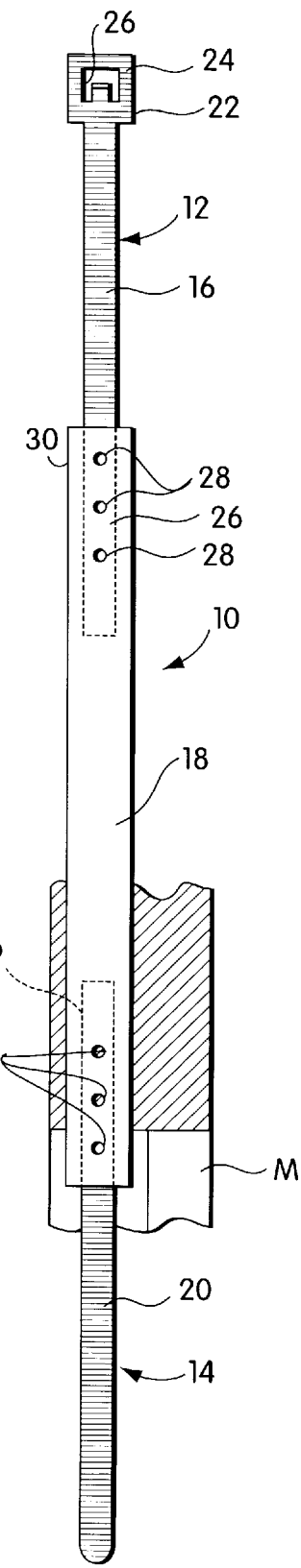
FIG. 2 is a view taken along the lines 2—2 of FIG. 1.

The elongated strap 10 has its middle segment 18 which is comprised of a molded band of silicone. The portion of the proximal end of the first segment intermates with a first end 30 of the middle segment 18. The molded band of silicone intrudes within the openings 28 at the proximal end of the first segment 16, as shown in FIGS. 1 and 2, to function as securement or anchoring means therebetween. The middle segment 18 of the elongated strap 10 comprising the silicone band is also has a second end 34.

The third segment 20 of the elongated strap 10, comprising the tongue of the strap, is comprised of an elongated web of nylon. The third segment 20 has a proximal end 36 which inter-mates with the second end 34 of the middle segment 18, the nylon third segment 20 also having a plurality of openings 38 therethrough, into which the molded silicone flows and is disposed. The openings 38 in the proximal end of the third segment 20 of the elongated strap provide the lockability between the middle segment 18 (of silicone) and the tongue portion 20 of the elongated strap 10.

It is thus intended that a preferred embodiment of the present invention be comprised of multiple components of material such as silicone and nylon, which are inter-engaged. The webs of nylon segments 16 and 20 comprise the ends of the elongated strap 10, and the silicone segment 18 comprising the mid or central portion of the elongated strap 10 to permit stretchability thereof. The nylon segments 16 and 20 are secured within the respective ends of the silicone (middle) segment 18 and are locked therein by virtue of the openings 28 and 38 through the webs of nylon into which the silicone flows during the molding/manufacturing process and in some cases by chemical bonding between the two materials.

During the manufacturing process, the respective first and third segments 16 and 18, that is the nylon components of the elongated strap 10, would be mated within a pair of openings within a mold "M". The holes 28 and 38 within those straps 16 and 20 would be received within that mold and silicone would be injected within the mold "M" to create the elongated middle segment 18 of that elongated strap 10, that silicone filling those openings 28 and 38 within the respective end segments 16 and 20 of the elongated strap 10.

Figure 3:
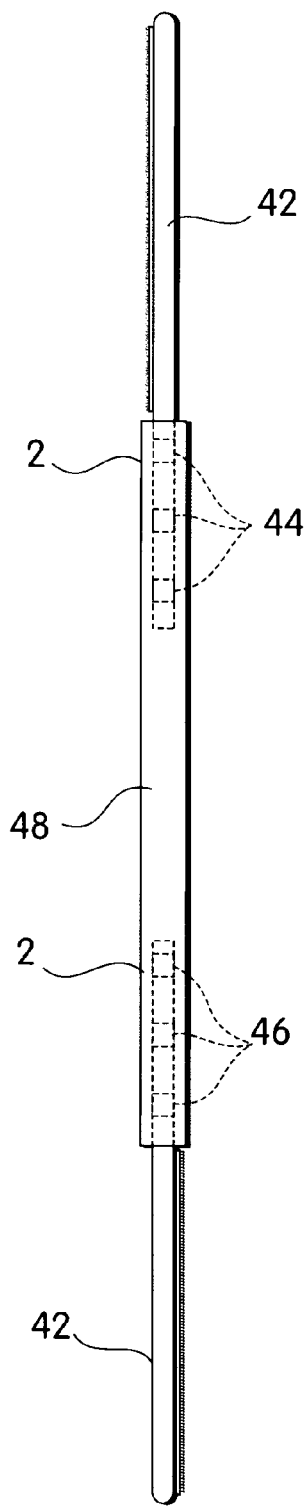
FIG. 3 is a plan view of a further preferred embodiment of the present invention.
Figure 4:
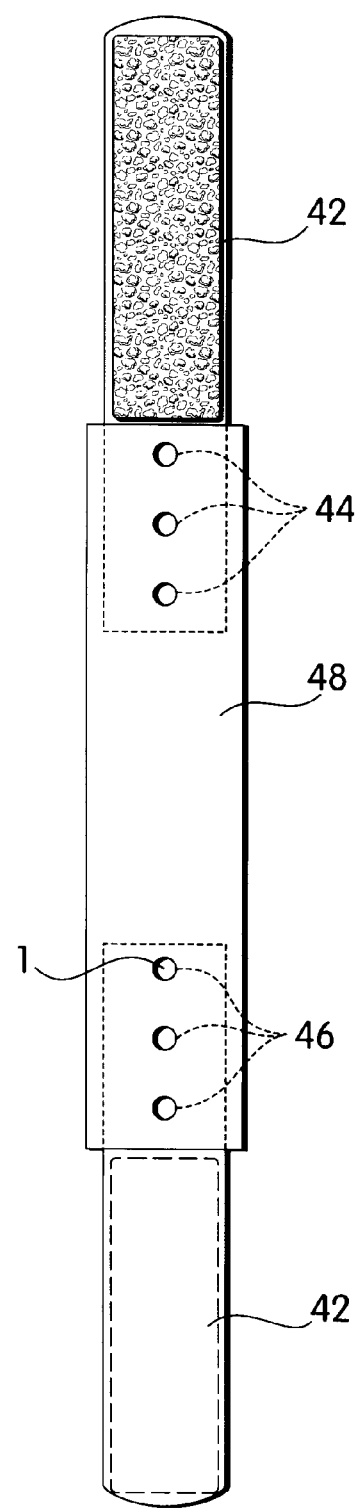
FIG. 4 is a view taken along the lines 4—4 of FIG. 3.

A further preferred embodiment of the elongated strap 40 present invention, may be seen in FIGS. 3 and 4, comprises the replacement of each the respective nylon segments 16 and 20, by an elongated strap 42 having Velcro™ thereon. Each elongated first and third segments 42 would have their respective openings 44 and 46 therethrough, for engagement by the silicone in the mid segment 48, when the molding operation takes place. The middle segment 48 of the silicone would thus provide the stretchability to this second preferred embodiment, and the respective outer ends 42 of the elongated strap 40 would each have a Velcro™ securement means thereon for securing the two respective ends 42 theretogether.

Thus what has been shown is a novel multi component securable strap arrangement, which permits flexibility and stretchability in a securement strap. The amount of stretchability is of course dependent upon the length of the elongated middle segment of silicone. It is contemplated that in each of the preferred embodiments, the first, second, and third segments are of approximately the same length.

As our invention, we claim:

1. An elongated securement strap comprised to a plurality of joined segments, comprising:

an elongated first flexible segment of material having a first end and a second end;

an elongated second stretchable segment of material having a first end and a second end; and an elongated third flexible segment of material having a first end and a second end, wherein said segments are joined in an overlapping relationship to form said elongated strap, said first segment being disposed at said first end of the second segment and said third segment being disposed at said second end of said second segment;

said securement strap being stretchable to a length dependant only upon a length of said elongated second segment of material:

adjustable securement means on at least one end of either said first and third segments or both of them to join them together.

2. The elongated securement strap as recited in claim 1 wherein said second end of said first segment and said first end of said third segment have securement openings therein.

3. The elongated securement strap as recited in claim 1 wherein said stretchable material is comprised of silicone or other elastomer.

4. The elongated securement strap as recited in claim 1 wherein said stretchable material fills-in said securement openings in said first and second segments of said elongated strap during a manufacturing process thereof.

5. The elongated securement strap as recited in claim 1 wherein said first and third segments are comprised of nylon.

6. The elongated securement strap as recited in claim 1 wherein said first and third segments are comprised of a securement material.

7. The elongated securement strap as recited in claim 6 wherein said securement material consists of a hook and loop fabric.

8. The elongated securement strap as recited in claim 1 wherein said first end of said first segment has a receiving buckle thereon.

* * * * *